(12) United States Patent
Sato et al.

(10) Patent No.: US 7,384,703 B2
(45) Date of Patent: Jun. 10, 2008

(54) FUEL CELL SYSTEM

(75) Inventors: Masahiko Sato, Wako (JP); Hideaki Kikuchi, Wako (JP); Yosuke Fujii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 593 days.

(21) Appl. No.: 10/863,196

(22) Filed: Jun. 7, 2004

(65) Prior Publication Data

US 2004/0253499 A1 Dec. 16, 2004

(51) Int. Cl.
*H01M 2/08* (2006.01)
*H01M 2/14* (2006.01)

(52) U.S. Cl. .......................................... 429/38; 429/36

(58) Field of Classification Search .................. 429/12, 429/32, 38

See application file for complete search history.

(56) References Cited

U.S. PATENT DOCUMENTS 6,455,179 B1 * 9/2002 Sugita et al. .................. 429/12
6,858,338 B2 2/2005 Sugiura et al. ............... 429/32

FOREIGN PATENT DOCUMENTS

| JP | 6-275307 | 9/1994 |
|---|---|---|
| JP | 2000-164236 | 6/2000 |
| JP | 2001-68140 | 3/2001 |
| JP | 2001-76751 | 3/2001 |
| JP | 2001-143740 | 5/2001 |
| JP | 2002-362164 | 12/2002 |
| JP | 2002-367641 | 12/2002 |
| JP | 2003-157864 | 5/2003 |

* cited by examiner

*Primary Examiner*—Patrick Joseph Ryan
*Assistant Examiner*—Thomas H. Parsons
(74) *Attorney, Agent, or Firm*—Hamre, Schumann, Mueller & Larson, P.C.

(57) ABSTRACT

First and second fuel cell stacks having a simple and compact structure are connected in parallel to each other to enable ensuring a desired electric power generating performance. The first and second fuel cell stacks have the same structure and are arranged in parallel to each other with polarities thereof reversed. A manifold piping is mounted to one ends of the first and second fuel cell stacks. In order to supply an oxidizer gas, a fuel gas, and a coolant to the first and second fuel cell stacks, at least an oxidizer-gas supply pipe, a fuel-gas supply pipe, and a coolant supply pipe in the manifold piping are provided to be symmetrical with respect to the first and second fuel cell stacks.

2 Claims, 7 Drawing Sheets

FUEL CELL SYSTEM

BACKGROUND OF THE INVENTION

1. Field of the Invention

The present invention relates to fuel cell system provided with fuel cell stacks, in which a plurality of unit cells comprising a membrane electrode assembly having a pair of electrodes on both sides of an electrolyte are stacked horizontally so as to be interposed by separators.

2. Description of the Related Art

For example, a solid polymer electrolyte fuel cell comprises a unit cell or cells, each having a membrane electrode assembly being interposed by the separators. Further, said membrane electrode assembly is comprised of an anode-side electrode and a cathode-side electrode to be provided on both sides of an electrolyte (electrolyte membrane) so as to be opposed each other, where said electrolyte is composed of a polymer ion-exchange membrane (positive ion-exchange membrane). This type of unit cell comprises membrane electrode assemblies and separators in general, a predetermined numbers of said assemblies and separators are alternately stacked on one another to constitute a fuel cell stack.

In the unit cell, a fuel gas, for example, mainly a gas containing hydrogen (referred below to as hydrogen containing gas), supplied to the anode-side electrode is ionized on an electrode catalyst and moved toward the cathode-side electrode through the electrolyte. Electrons generated in the meantime are taken into an external circuit to be made use of as a DC electric energy. In addition, since an oxidizer gas, for example, a gas mainly containing oxygen, or an air, (referred below to as oxygen containing gas) is supplied to the cathode-side electrode, hydrogen ions, electrons, and oxygen react on the cathode-side electrode to generate water.

By the way, in the case where a fuel cell stack is mounted in a vehicle for use, for example, many unit cells are required for being stacked in order to get a desired high output energy. In this occasion, it causes a problem such that unit cells are considerably extended in a stacking direction, whereby a fuel gas ends up being supplied insufficiently to the respective unit cells.

Figure 7:
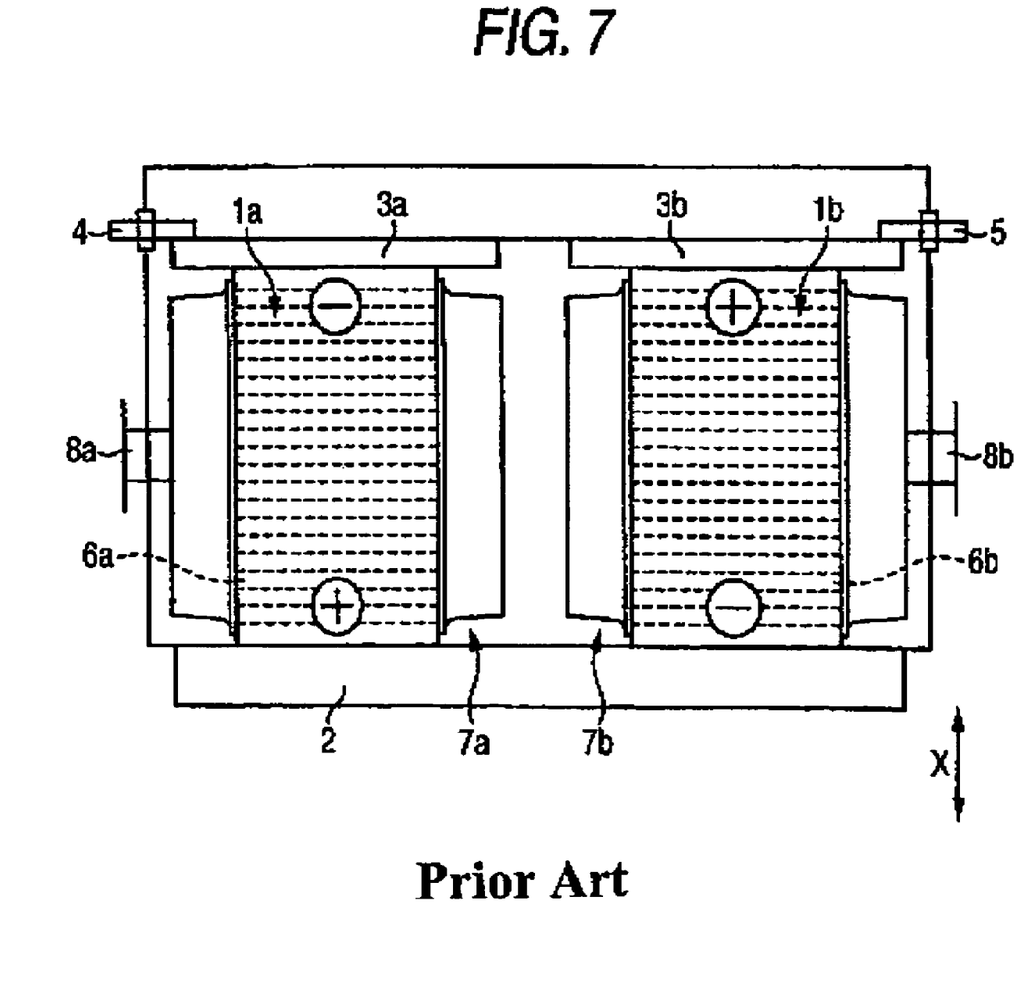
FIG. 7 is a view illustrating a structure of a fuel cell system disclosed in Patent document 1.

FIG. 7 illustrates a fuel cell as disclosed in JP-A-6-275307, paragraph 0012 and reference FIG. 1 (hereafter Patent Document 1) that comprises two stacks 1a, 1b which are directly arranged on a lower common clamp plate 2 for commonly connecting both the stacks. The stack 1a is set with the positive electrode to be disposed on a lower side while the stack 1b is set with the positive electrode to be disposed on an upper side, whereby serial connection of the stacks 1a and 1b can be made electrically by the lower common clamp plate 2. Moreover, an upper clamp plate 3a on the stack 1a is connected to a negative electrode terminal 4 and an upper clamp plate 3b on the stack 1b is connected to a positive electrode terminal 5, whereby the negative electrode terminal 4 and the positive electrode terminal 5 can be connected to each other.

The stacks 1a, 1b, respectively, comprise a plurality of unit cells 6a, 6b, which are stacked in a direction as indicated by an arrow X, and the manifolds 7a, 7b for supplying and discharging the reaction-gas, which are mounted on the respective sides of the stacks 1a, 1b. The manifolds 7a, 7b are provided with joints 8a, 8b, and each of the joints is connected to an external piping (not shown).

With the Patent Document 1, however, such manifolds 7a, 7b must be further provided in accordance with the specific purposes such as supplying and discharging a fuel gas, an oxidizer gas, and a coolant from the respective stacks 1a, 1b. Therefore, the piping system becomes complicated and large in size, and the whole size of the fuel cell stacks becomes also considerably large one. Thereby, space factor is decreased which pointed out a problem of the fuel cell disclosed in the Patent Document being not useful or efficient for the vehicle-mounting application.

SUMMARY OF THE INVENTION

The invention solves this type of problem and has its object to provide a fuel cell system, in which the first and the second fuel cell stacks structure are connected in parallel to each other with a simple and a compact structure, and also it secures a desired electric power generating performance.

Also, it is an object of the invention to provide a fuel cell system that is simple and compact in structure, can be easily assembled in various locations of installation, and is excellent in handling quality.

A fuel cell system according to the invention of claim 1 comprises first and second fuel cell stacks having the same structure and comprising a plurality of unit cells, which comprise a membrane electrode assembly provided with a pair of electrodes provided on both sides of an electrolyte and interposed by separators, the plurality of unit cells being stacked horizontally, the respective unit cells being formed therethrough with a fuel-gas inlet communication hole, an oxidizer-gas inlet communication hole, a coolant inlet communication hole, a fuel-gas outlet communication hole, an oxidizer-gas outlet communication hole, and a coolant outlet communication hole.

The first and second fuel cell stacks are arranged in parallel along a direction of stacking and with polarities thereof reversed. Respective end plates on one adjacent ends of the first and second fuel cell stacks mount thereon a manifold piping. The manifold piping comprises respective pipes provided to be symmetrical with respect to the first and second fuel cell stacks to provide communication between the respective fuel-gas inlet communication holes, between the respective oxidizer-gas inlet communication holes, between the respective coolant inlet communication holes, between the respective fuel-gas outlet communication holes, between the respective oxidizer-gas outlet communication holes, and between the respective coolant outlet communication holes.

In this manner, it suffices that the first and second fuel cell stacks have the same structure and be arranged with polarities thereof reversed. Accordingly, the first and second fuel cell stacks are sharply reduced in manufacturing cost as compared with the case where the first and second fuel cell stacks are different in structure from each other.

Besides, with the manifold piping, the respective pipes that provide communication between the respective fuel-gas inlet communication holes, between the respective oxidizer-gas inlet communication holes, between the respective coolant inlet communication holes, between the respective fuel-gas outlet communication holes, between the respective oxidizer-gas outlet communication holes, and between the respective coolant outlet communication holes are structured to be symmetrical with respect to the first and second fuel cell stacks. Therefore, the manifold piping can be connected corresponding to an intermediate position between the first and second fuel cell stacks.

Thereby, it becomes possible to distribute the fuel gas, the oxidizer gas, the coolant evenly to the first and second fuel cell stacks from the manifold piping, so that the first and second fuel cell stacks can surely exhibit a desired electric power generating performance. Further, the manifold piping is simplified in piping structure and space-saving is easily achieved.

Also, with the fuel cell system according to the invention of claim 2, the first and second fuel cell stacks comprise series connections connected electrically to a side of the one ends, to which the manifold piping is mounted. Thereby, a electric potential difference between the one sides of the first and second fuel cell stacks is decreased, so that no shunt current through liquid is caused in the manifold piping mounted on the one sides. Accordingly, for example, electrolytic corrosion of metallic parts is effectively prevented.

Further, a fuel cell system according to the invention of claim 3 comprises stacking bodies comprising a plurality of unit cells, which comprise a membrane electrode assembly provided with a pair of electrodes provided on both sides of an electrolyte and interposed by separators, the plurality of unit cells being stacked horizontally, and first and second end plates arranged on both sides of the stacking bodies.

The stacking bodies are formed vertically on one lateral ends of the respective unit cells with first to third communication holes, which extend therethrough in a direction of stacking, and formed vertically on the other lateral ends of the respective unit cells with fourth to sixth communication holes, which extend therethrough in the direction of stacking. The first to sixth communication holes are selectively set to be a fuel-gas inlet communication hole, an oxidizer-gas inlet communication hole, a coolant inlet communication hole, a fuel-gas outlet communication hole, an oxidizer-gas outlet communication hole, and a coolant outlet communication hole. Further, the first and second end plates, respectively, are formed with first to sixth through-holes and seventh to twelfth through-holes, which extend therethrough in the direction of stacking and are communicated to the first to sixth communication holes, respectively.

Thereby, a piping structure, in which the manifold piping is connected to the first to sixth through-holes of the first end plate and the seventh to twelfth through-holes of the second end plate are closed, and a piping structure, in which the manifold piping is connected to the seventh to twelfth through-holes of the second end plate and the first to sixth through-holes of the first end plate are closed, are selectively adopted. Accordingly, an optimum piping connection is enabled according to a location, in which the fuel cell stack is installed, and so the fuel cell stack is effectively improved in freedom of installation.

DESCRIPTION OF THE PREFERRED EMBODIMENTS

Figure 1:
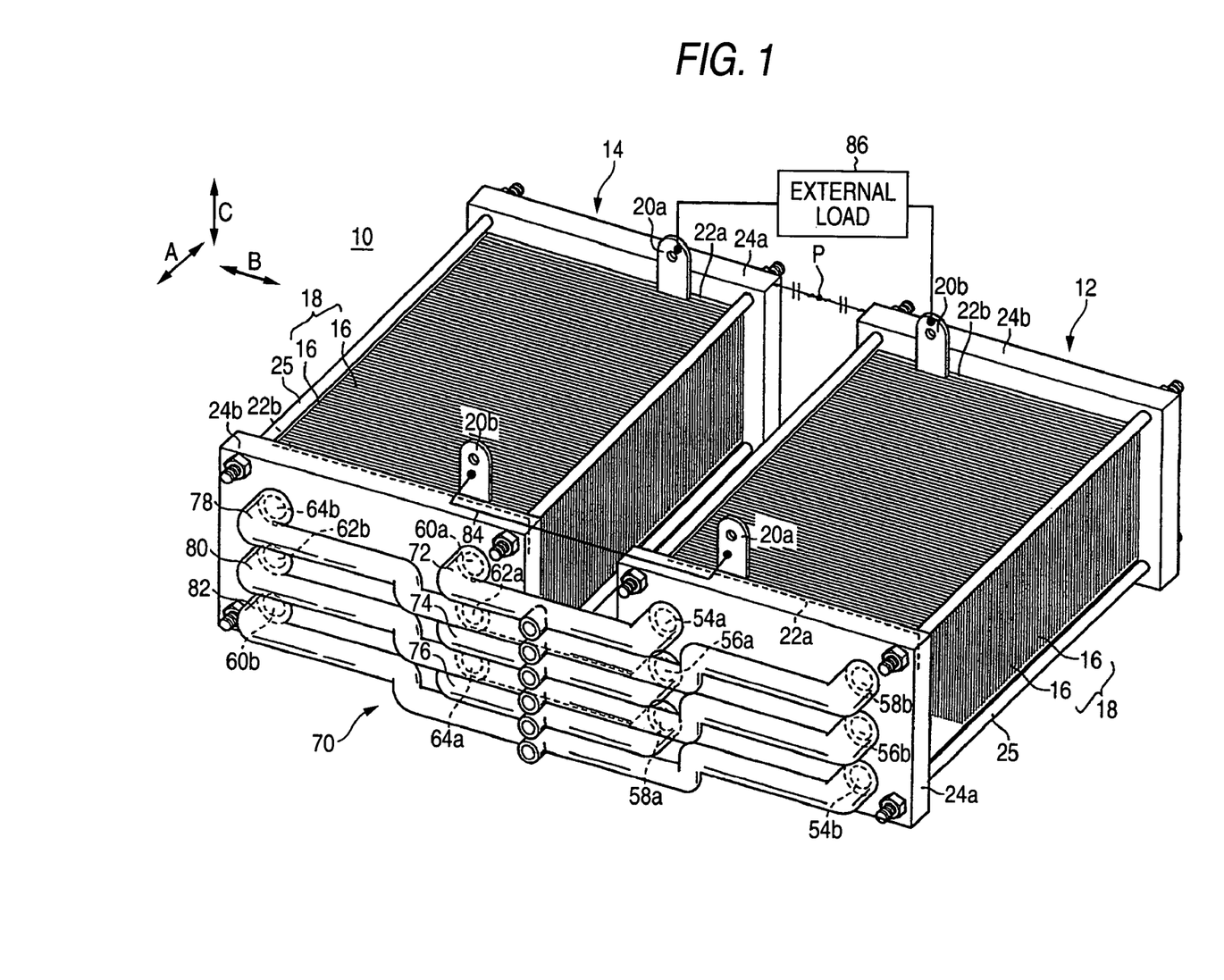
FIG. 1 is a perspective view schematically showing a fuel cell system according to a first embodiment of the invention.

FIG. 1 is a perspective view schematically showing an entire fuel cell system 10 according to a first embodiment of the invention.

Figure 2:
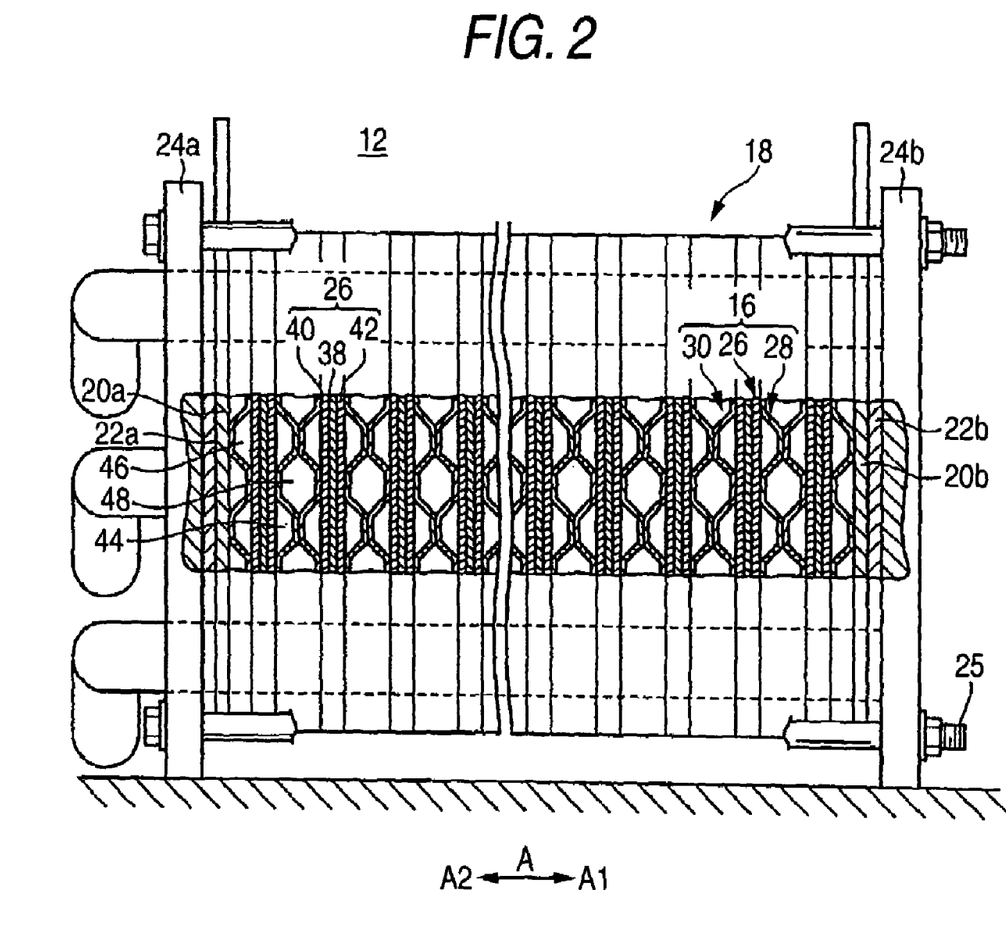
FIG. 2 is a side view showing, in partial cross section, a first fuel cell stack that constitutes the fuel cell system.

The fuel cell system 10 comprises a first fuel cell stack 12 and a second fuel cell stack 14, which are arranged in parallel to each other along a horizontal direction (direction indicated by an arrow A) and with polarities thereof reversed. As shown in FIGS. 1 and 2, the first fuel cell stack 12 comprises a stacked body 18, in which a plurality of unit cells 16 are stacked in the direction indicated by the arrow A, and first and second terminal plates 20a, 20b, first and second insulator plates 22a, 22b, and first and second end plates 24a, 24b, respectively, are arranged outward in this order on both ends of the stacked body 18 in a stacking direction. The first and second end plates 24a, 24b are clamped via a plurality of clamp rods 25 in the stacking direction such that a desired clamp load is applied to the stacked body 18.

Figure 3:
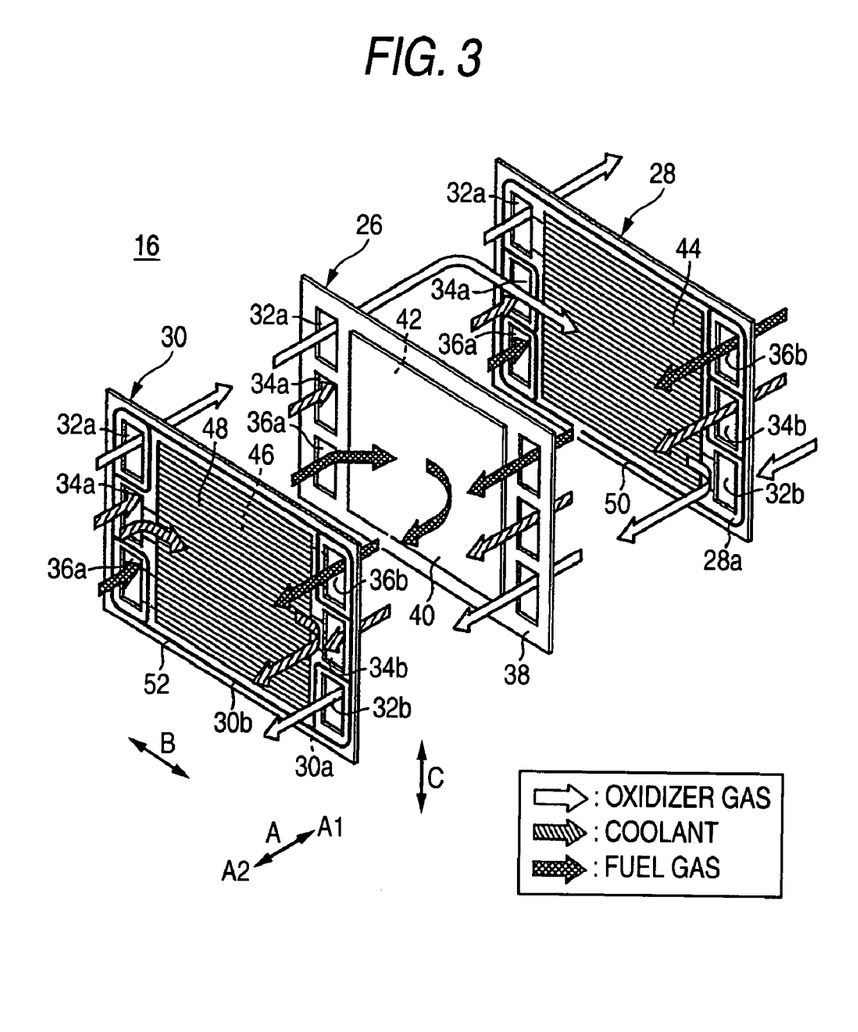
FIG. 3 is an exploded, perspective view showing a unit cell that constitutes the first and second fuel cell stacks.

As shown in FIGS. 2 and 3, the unit cell 16 comprises a membrane electrode assembly 26 interposed between first and second separators 28, 30. The first and second separators 28, 30 comprise metallic plates or carbon plates.

Provided on one end edge of the unit cell 16 in a direction (horizontal direction in FIG. 3) indicated by an arrow to be aligned in a direction C (vertical direction) indicated by an arrow C for mutual communication in the direction indicated by the arrow A being the stacking direction are oxidizer-gas inlet communication holes (first communication holes) 32a, through which an oxidizer gas, for example, an oxygen containing gas is supplied, coolant inlet communication holes (second communication holes) 34a, through which a coolant is supplied, and fuel-gas inlet communication holes (third communication holes) 36a, through which a fuel gas, for example, a hydrogen containing gas is supplied.

Provided on the other end edge of the unit cell 16 in the direction indicated by the arrow B to be aligned in the direction indicated by the arrow C for mutual communication in the direction indicated by the arrow A are fuel-gas outlet communication holes (fourth communication holes) 36b, through which a fuel gas is discharged, coolant outlet communication holes (fifth communication holes) 34b, through which a coolant is discharged, and oxidizer-gas outlet communication holes (sixth communication holes) 32b, through which an oxidizer gas is discharged.

The membrane electrode assembly 26 comprises a solid polymer electrolyte membrane 38 composed of, for example, a thin film of perfluoro sulfonic acid impregnated with water, an anode-side electrode 40 and a cathode-side electrode 42, between which the solid polymer electrolyte membrane 38 is interposed. The anode-side electrode 40 and the cathode-side electrode 42 comprise a gas diffusion layer made of carbon paper, etc. and electrode catalyst layers formed by applying porous carbon particles, on surfaces of which a platinum alloy is carried, evenly on surfaces of the gas diffusion layer. The electrode catalyst layers are joined to both surfaces of the solid polymer electrolyte membrane 38 in a manner to face each other with the solid polymer electrolyte membrane 38 therebetween.

Figure 4:
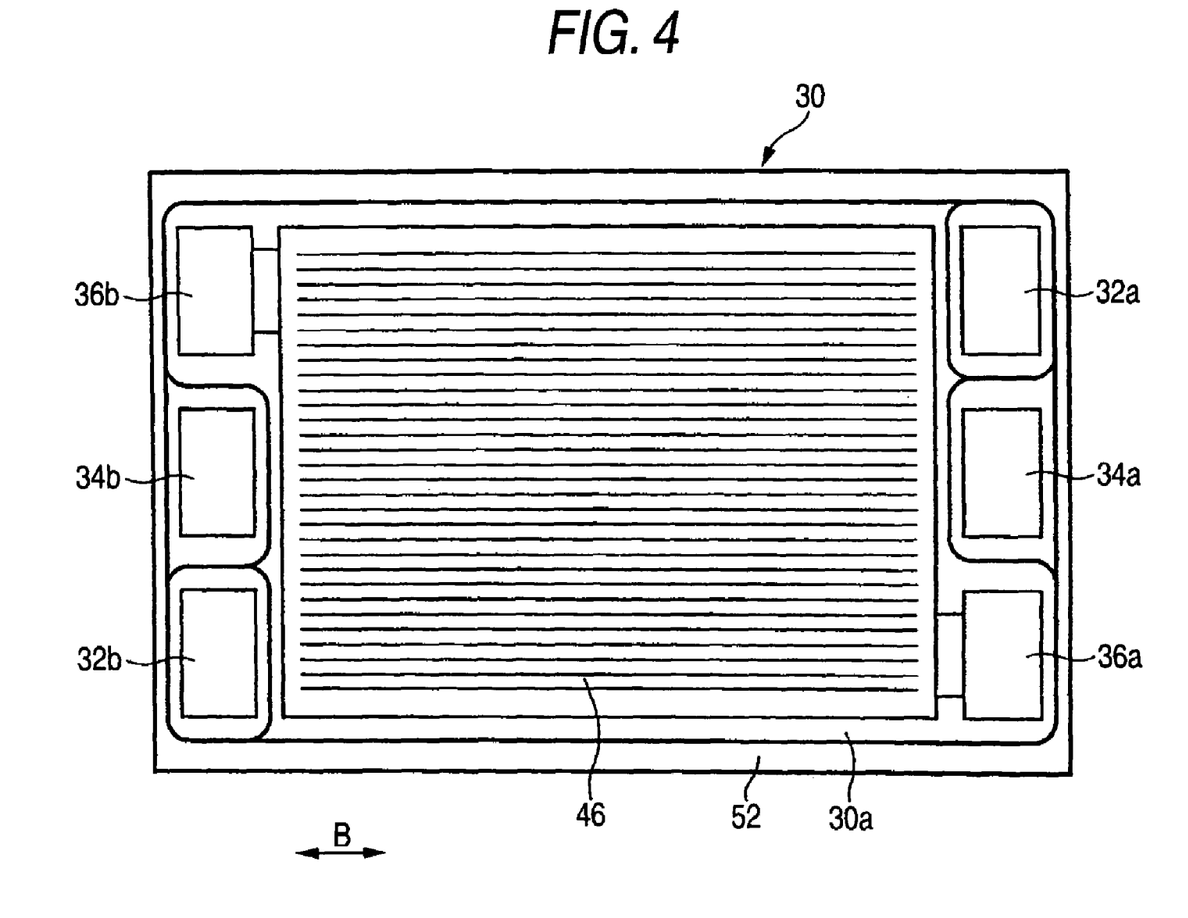
FIG. 4 is a front view showing a second separator that constitutes the unit cell.

A surface 28a of the first separator 28 opposed to the cathode-side electrode 42 is provided with linear oxidizer-gas flow passages 44 that extend in, for example, the direction indicated by the arrow B. As shown in FIG. 4, a surface 30a of the second separator 30 opposed to the anode-side electrode 40 is provided with linear fuel-gas flow passages 46 that are communicated to the fuel-gas inlet communication holes 36*a* and the fuel-gas outlet communication holes 36*b* and extended in the direction indicated by the arrow B.

Formed between a surface 28*b* of the first separator 28 and a surface 30*b* of the second separator 30 are coolant flow passages 48 that are communicated to the coolant inlet communication holes 34*a* and the coolant outlet communication holes 34*b* (see FIGS. 2 and 3). The coolant flow passages 48 are extended linearly in the direction indicated by the arrow B. A first seal member 50 is united with the surfaces 28*a*, 28*b* of the first separator 28 and a second seal member 52 is united with the surfaces 30*a*, 30*b* of the second separator 30.

Figure 5:
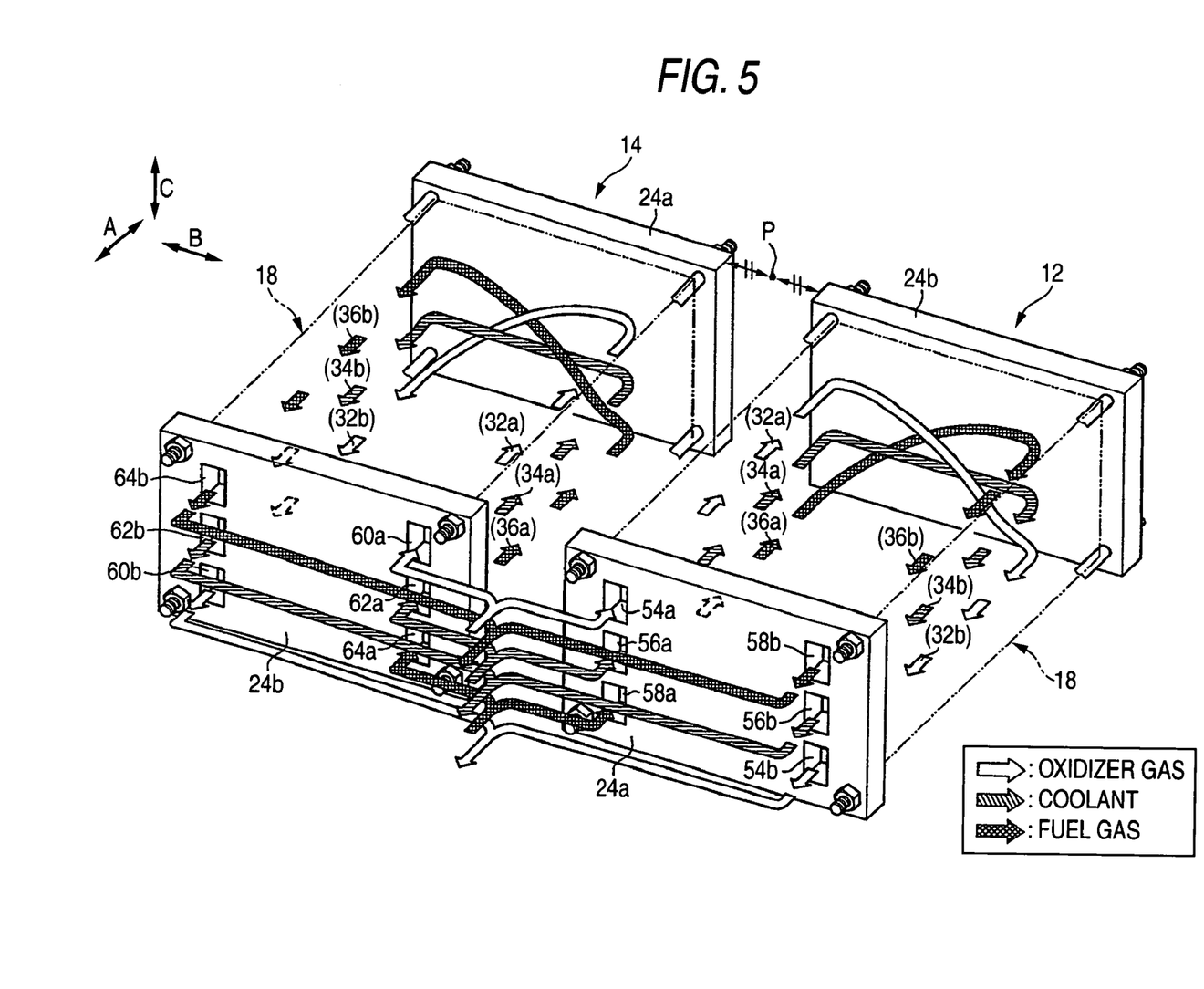
FIG. 5 is a view illustrating flows of a reaction gas and a coolant in the fuel cell system.

As shown in FIG. 5, the first end plate 24*a* is provided at one end edge thereof in the direction indicated by the arrow B with an oxidizer-gas inlet (first through-hole) 54*a*, a coolant inlet (second through-hole) 56*a*, and a fuel-gas inlet (third through-hole) 58*a*, which inlets extend in the stacking direction. The first end plate 24*a* is provided at the other end edge thereof with an fuel-gas outlet (fourth through-hole) 58*b*, a coolant outlet (fifth through-hole) 56*b*, and an oxidizer-gas outlet (sixth through-hole) 54*b*, which outlets extend in the stacking direction.

The second fuel cell stack 14 is structured in substantially the same manner as the first fuel cell stack 12 structured in the above manner, the same constituents as those of the first fuel cell stack are denoted by the same reference numerals, and an explanation therefor is omitted.

The stacked bodies 18 constituting the first and second fuel cell stacks 12, 14 have one and the same structure, and in order to reverse polarities of the respective stacked bodies, for example, the stacked body 18 constituting the second fuel cell stack 14 is turned 180° about a vertical axis reversely relative to the stacked body 18 constituting the first fuel cell stack 12.

The second end plate 24*b* of the second fuel cell stack 14 is provided, as shown in FIG. 5, with an oxidizer-gas inlet (seventh through-hole) 60*a*, a coolant inlet (eighth through-hole) 62*a*, a fuel-gas inlet (ninth through-hole) 64*a*, a fuel-gas outlet (tenth through-bole) 64*b*, a coolant outlet (eleventh through-hole) 62*b*, and an oxidizer-gas outlet (twelfth through-hole) 60*b*.

The oxidizer-gas inlets 54*a*, 60*a*, the coolant inlets 56*a*, 62*a*, and the fuel-gas inlets 58*a*, 64*a* are arranged in positions close to each other and symmetrical with respect to an intermediate point P between the first and second fuel cell stacks 12, 14 while the fuel-gas outlets 58*b*, 64*b*, the coolant outlets 56*b*, 62*b*, and the oxidizer-gas outlets 54*b*, 60*b* are arranged in positions away from and symmetrical with respect to each other.

As shown in FIG. 1, the first and second end plates 24*a*, 24*b* on adjacent one ends of the first and second fuel cell stacks 12, 14 mount thereon a manifold piping 70, through which the fuel gas, the oxidizer gas, and the coolant are supplied and discharged.

The manifold piping 70 comprises an oxidizer-gas supply pipe 72 for communication between the oxidizer-gas inlets 54*a*, 60*a*, a coolant supply pipe 74 for communication between the coolant inlets 56*a*, 62*a*, a fuel-gas supply pipe 76 for communication between the fuel-gas inlets 58*a*, 64*a*, a fuel-gas discharge pipe 78 for communication between the fuel-gas outlets 58*b*, 64*b*, a coolant discharge pipe 80 for communication between the coolant outlets 56*b*, 62*b*, and an oxidizer-gas discharge pipe 82 for communication between the oxidizer-gas outlets 54*b*, 60*b*.

The oxidizer-gas supply pipe 72, the coolant supply pipe 74, the fuel-gas supply pipe 76, the fuel-gas discharge pipe 78, the coolant discharge pipe 80, and the oxidizer-gas discharge pipe 82 are set to be symmetrical with respect to the intermediate point P between the first and second fuel cell stacks 12, 14.

The first terminal plate 20*a* of the first fuel cell stack 12 close to the manifold piping 70 and the second terminal plate 20*b* of the second fuel cell stack 14 close to the manifold piping 70 are connected electrically to each other through a length of cable (series connection) 84. While the first terminal plate 20*a* is, for example, a negative pole, the second terminal plate 20*b* is, for example, a positive pole, and these plates are connected electrically to each other through the length of cable 84 whereby the first and second fuel cell stacks 12, 14 are connected electrically in series to each other.

The second terminal plate 20*b* of the first fuel cell stack 12 and the first terminal plate 20*a* of the second fuel cell stack 14 are connected to an external load 86 such as motor, etc.

An operation of the fuel cell system 10 structured in the above manner will be described below.

First, as shown in FIG. 1, an oxidizer gas such as an oxygen containing gas, etc. is supplied to the oxidizer-gas supply pipe 72 that constitutes the manifold piping 70, and a fuel gas such as a hydrogen containing gas, etc. is supplied to the fuel-gas supply pipe 76. Further, a coolant such as pure water, ethylene glycol, oil, etc. is supplied to the coolant supply pipe 74.

As shown in FIG. 5, the oxidizer gas supplied to the oxidizer-gas supply pipe 72 is distributed in the direction (right and left) indicated by the arrow B within the oxidizer-gas supply pipe 72 to be supplied to the oxidizer-gas inlet communication holes 32*a* of the stacked body 18 from the oxidizer-gas inlet 54*a* provided on the first end plate 24*a* of the first fuel cell stack 12 and to be supplied to the oxidizer-gas inlet communication holes 32*a* of the stacked body 18 from the oxidizer-gas inlet 60*a* provided on the second end plate 24*b* of the second fuel cell stack 14.

Likewise, the fuel gas supplied to the fuel-gas supply pipe 76 is distributed right and left to be supplied to the fuel-gas inlet communication holes 36*a* of the stacked body 18, which constitutes the first fuel cell stack 12, from the fuel-gas inlet 58*a* of the first end plate 24*a* and to be supplied to the fuel-gas inlet communication holes 36*a* of the stacked body 18, which constitutes the second fuel cell stack 14, from the fuel-gas inlet 64*a* of the second end plate 24*b*.

Further, the coolant supplied to the coolant supply pipe 74 is distributed right and left to be supplied to the respective coolant inlet communication holes 34*a* of the stacked bodies 18, which constitute the first and second fuel cell stacks 12, 14, from the coolant inlets 56*a*, 62*a*.

Therefore, as shown in FIG. 3, the oxidizer gas is moved in a direction indicated by an arrow A1 to be introduced into the oxidizer-gas flow passages 44 of the first separator 28 from the oxidizer-gas inlet communication holes 32*a* to be moved in the direction indicated by the arrow B and supplied to the cathode-side electrode 42 that constitutes the membrane electrode assembly 26. Meanwhile, the fuel gas is moved in the direction indicated by the arrow A1 to be introduced into the fuel-gas flow passages 46 of the second separator 30 from the fuel-gas inlet communication holes 36*a* to be moved in the direction indicated by the arrow B and supplied to the anode-side electrode 40 that constitutes the membrane electrode assembly 26.

Accordingly, in the respective membrane electrode assemblies 26, the oxidizer gas supplied to the cathode-side electrode 42 and the fuel gas supplied to the anode-side electrode 40 are consumed due to electrochemical reaction in electrode catalyst layers to produce electric power.

Next, the oxidizer gas supplied to the cathode-side electrode 42 to be consumed flows along the oxidizer-gas outlet communication holes 32b in a direction indicated by an arrow A2 and then is discharged from the oxidizer-gas outlet 54b provided on the first end plate 24a of the first fuel cell stack 12 and from the oxidizer-gas outlet 60b provided on the second end plate 24b of the second fuel cell stack 14 (see FIG. 5).

Likewise, the fuel gas supplied to the anode-side electrode 40 to be consumed flows, as shown in FIG. 3, along the fuel-gas outlet communication holes 36b in the direction indicated by the arrow A2 and then is discharged from the fuel-gas outlet 58b provided on the first end plate 24a of the first fuel cell stack 12 and from the fuel-gas outlet 64b provided on the second end plate 24b of the second fuel cell stack 14 (see FIG. 5).

Also, the coolant supplied to the coolant inlet communication holes 34a is introduced into the coolant flow passages 48 between the first and second separators 28, 30 and then flows in the direction indicated by the arrow B. After having cooled the membrane electrode assembly 26, the coolant moves in the direction indicated by the arrow A2 and is discharged from the coolant outlet 56b provided on the first end plate 24a of the first fuel cell stack 12 and from the coolant outlet 62b provided on the second end plate 24b of the second fuel cell stack 14 (see FIG. 5).

In this case, it suffices in the first embodiment that the first and second fuel cell stacks 12, 14 have the same structure and be arranged in parallel to each other in the stacking direction with mutual polarities thereof reversed. Therefore, the first and second fuel cell stacks 12, 14 are sharply reduced in manufacturing cost as compared with the case where the first and second fuel cell stacks 12, 14 are different in structure from each other.

Besides, at least the oxidizer-gas supply pipe 72, the coolant supply pipe 74, and the fuel-gas supply pipe 76 in the manifold piping 70 are structured to be symmetrical with respect to the intermediate point P between the first and second fuel cell stacks 12, 14. Accordingly, there is produced an effect that the oxidizer gas, the coolant, and the fuel gas can be distributed and supplied evenly to the first and second fuel cell stacks 12, 14 from the manifold piping 70 and the first and second fuel cell stacks 12, 14 can surely exhibit a desired electric power generating performance.

Further, the manifold piping 70 is effectively simplified in piping structure and easily made small in size to enable achieving space-saving of the entire fuel cell system 10.

Furthermore, the first and second terminal plates 20a, 20b of the first and second fuel cell stacks 12, 14 are close to the manifold piping 70 to be connected electrically in series to each other through the length of cable 84. Thereby, an electric potential difference between the first and second terminal plates 20a, 20b is decreased, so that no shunt current through liquid is caused in the manifold piping 70 mounted on the first and second terminal plates 20a, 20b. Therefore, for example, electrolytic corrosion of metallic parts is effectively prevented.

Figure 6:
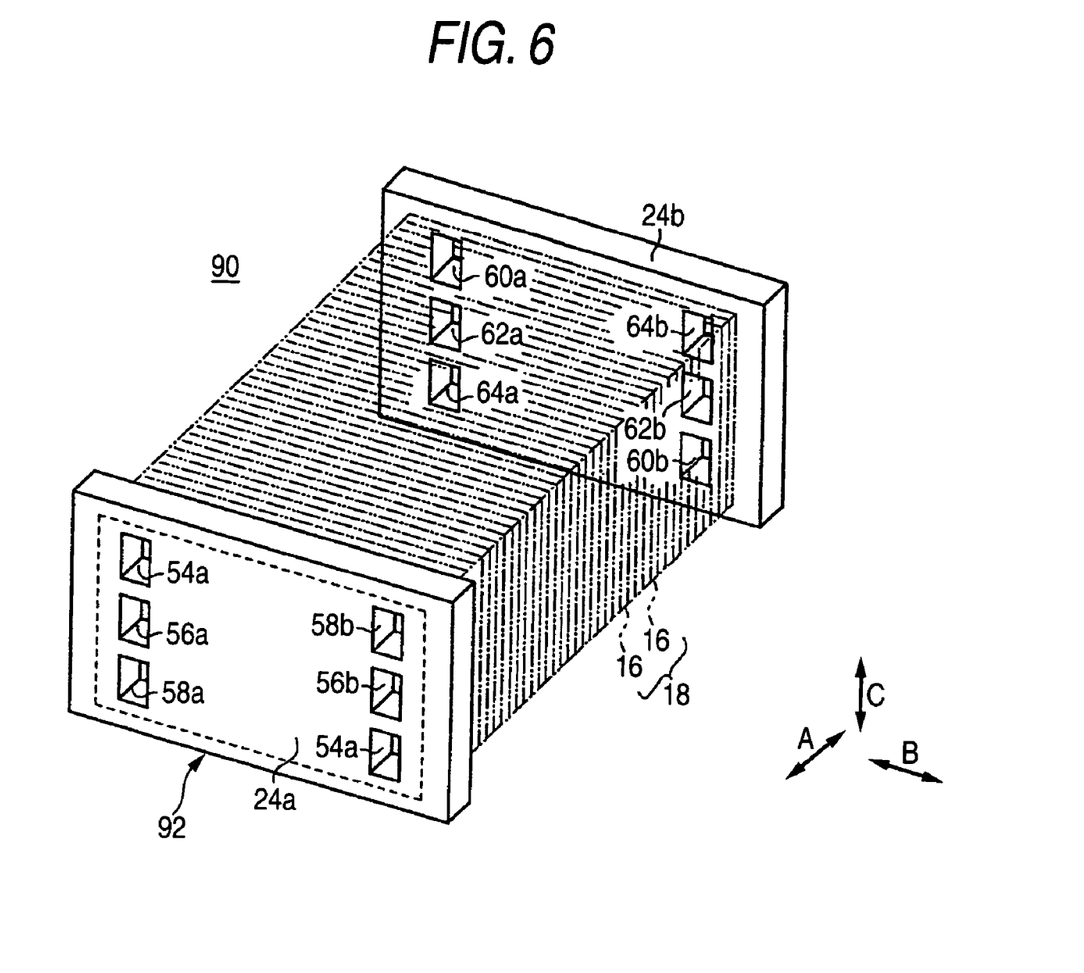
FIG. 6 is a perspective view schematically showing a fuel cell system according to a second embodiment of the invention.

FIG. 6 is a perspective view schematically showing an entire fuel cell system 90 according to a second embodiment of the invention. In addition, the same constituents as those of the fuel cell system 10 according to the first embodiment are denoted by the same reference numerals, and an explanation therefor is omitted.

According to the second embodiment, the fuel cell system 90 comprises a single fuel cell stack 92. A first end plate 24a that constitutes the fuel cell stack 92 is provided with an oxidizer-gas inlet 54a, a coolant inlet 56a, a fuel-gas inlet 58b, a fuel-gas outlet 58b, a coolant outlet 56b, and an oxidizer-gas outlet 54b. A second end plate 24b that constitutes the fuel cell stack 92 is provided with an oxidizer-gas inlet 60a, a coolant inlet 62a, a fuel-gas inlet 64b, an fuel-gas outlet 64b, a coolant outlet 62b, and an oxidizer-gas outlet 60b.

In the second embodiment structured in this manner, the first end plates 24a, 24b are formed with through-holes (not shown). Accordingly, a piping structure, in which a manifold piping 70 is connected to the first end plate 24a and the second end plate 24b is closed, and a piping structure, in which a manifold piping 70 is connected to the second end plate 24b and the first end plate 24a is closed, are selectively adopted.

Thereby, there is produced an effect that an optimum piping connection is enabled according to a location, in which the fuel cell stack 92 is installed, and so the fuel cell stack 92 is effectively improved in freedom of installation. Besides, a plurality of fuel cell stacks 92 can be arranged electrically in series only by arranging the plurality of fuel cell stacks 92 in the stacking direction.

In the fuel cell system according to the invention, it suffices that the first and second fuel cell stacks have the same structure and be arranged with polarities thereof reversed, so that the first and second fuel cell stacks are sharply reduced in manufacturing cost as compared with the case where the first and second fuel cell stacks are different in structure from each other.

Besides, respective pipes of the manifold piping provided between the respective fuel-gas inlet communication holes, the respective oxidizer-gas inlet communication holes, and the respective coolant inlet communication holes are structured to be symmetrical with respect to the first and second fuel cell stacks. Thereby, the fuel gas, the oxidizer gas, and the coolant can be distributed evenly to the first and second fuel cell stacks from the manifold piping and the first and second fuel cell stacks can surely exhibit a desired electric power generating performance. Further, the manifold piping is simplified in piping structure and space-saving is easily achieved.

Also, it is possible according to the invention to selectively connect the piping to the first end plate and the second end plate. Thereby, an optimum piping connection is enabled according to a location, in which a fuel cell stack is installed, and so the fuel cell stack is effectively improved in freedom of installation.

What is claimed is:

1. A fuel cell system comprising:
a first fuel cell stack comprising a plurality of unit cells, being stacked horizontally, where each of said plurality of unit cells is comprised of a membrane electrode assembly with a pair of electrodes being provided on both sides of an electrolyte and further interposed by a pair of separators, and has a plurality of communication holes comprising a fuel-gas inlet communication hole, an oxidizer-gas inlet communication hole, a coolant inlet communication hole, a fuel-gas outlet communication hole, an oxidizer-gas outlet communication hole, and a coolant outlet communication hole, said plurality communication holes being formed horizontally throughout of said each of said plurality of unit cells;

a first end plate, being mounted at a distal end of the first fuel cell stack, on which a first set of through-holes comprising a fuel-gas inlet through-hole, an oxidizer-gas inlet through-hole, a coolant inlet through-hole, a fuel-gas outlet through-hole, and oxidizer-gas outlet through-hole, and a coolant outlet through-holes are formed so as to be connected to corresponding communication holes of said plurality of communication holes of the first fuel cell stack;

a second fuel cell stack comprising another plurality of unit cells where each of said another plurality of unit cells is a same structure as that of the first fuel cell stack, and has another plurality of communication holes with same functionalities as those of the first fuel cell stack, and a second end plate to be mounted at a distal end of the second fuel cell stack, said second end plate having a second set of through-holes with same functionalities as those of the first fuel end plate, wherein the first and second fuel cell stacks are arranged in parallel along a horizontally stacking direction of which polarities are set to be inversely disposed from each other, and further wherein said first and said second end plates are disposed adjacently in an imaginary plane in a way such that said first set of through-holes of the first end plate and said second set of through-holes of the second end plate are symmetrically arranged in the imaginary plane, which allows a manifold piping to communicate between communication holes of said first set of through-holes and respective communication holes of said second set of through-holes.

2. The fuel cell system according to claim 1, wherein serial connecting portions are provided with the first and second fuel cell stacks on a side where the manifold piping is made so as to be both connected electrically.

* * * * *

UNITED STATES PATENT AND TRADEMARK OFFICE
CERTIFICATE OF CORRECTION

PATENT NO. : 7,384,703 B2  
APPLICATION NO. : 10/863196  
DATED : June 10, 2008  
INVENTOR(S) : Masahiko Sato, Hideaki Kikuchi and Yosuke Fujii

Page 1 of 1

It is certified that error appears in the above-identified patent and that said Letters Patent is hereby corrected as shown below:

On the Title Page, Please add Item (30), Foreign Application Priority Data: --June 13, 2003 (JP) 2003-169227-- should be listed.

Signed and Sealed this

Twenty-third Day of September, 2008

JON W. DUDAS  
*Director of the United States Patent and Trademark Office*